March 31, 1970  H. H. HARMS ET AL  3,503,516
PRESSURE FILTER AND TUBULAR FILTER ELEMENTS THEREFOR
Filed Sept. 5, 1968  3 Sheets-Sheet 2

INVENTORS
HAROLD H. HARMS
STEPHEN N. McEWEN
BY
ATTORNEY

March 31, 1970   H. H. HARMS ET AL   3,503,516
PRESSURE FILTER AND TUBULAR FILTER ELEMENTS THEREFOR
Filed Sept. 5, 1968   3 Sheets-Sheet 3

INVENTORS
HAROLD H. HARMS
STEPHEN N. McEWEN
BY
ATTORNEY

United States Patent Office 3,503,516
Patented Mar. 31, 1970

3,503,516
PRESSURE FILTER AND TUBULAR FILTER ELEMENTS THEREFOR
Harold H. Harms, Toledo, and Stephen N. McEwen, Bowling Green, Ohio, assignors to Henry Manufacturing Co., Inc., Bowling Green, Ohio, a corporation of Ohio
Filed Sept. 5, 1968, Ser. No. 757,697
Int. Cl. B01d 29/30
U.S. Cl. 210—323                                9 Claims

ABSTRACT OF THE DISCLOSURE

A pressure filter comprising a pressure vessel divided into two chambers by an apertured plate supporting a plurality of tubular filter elements. Each filter element is comprised of a smooth, preferably irregular surfaced perforated tubular member such as plastic, which tubular member may have collars providing smooth rims at each of its ends and which tube may have an independent internal means for stiffening it. This tube is surrounded by a flexible monofilament fabric filter sleeve longer than the tube so that its ends fold over the smooth ends of the tube or rims of the collars and tuck into each end of the tube. A tubular connector frictionally holds each tucked-in end of the filter sleeve inside its associated end or rim, and one of the tubular connectors has a recessed grooved flange which seats an O-ring and also sealingly supports the tube filter element in the apertured plate of the pressure vessel. Fastening bolt type means extend through the tube and each tubular connector and releasably holds the connectors in engagement with the ends of the tube, and also closes the open end of the other tubular connector.

RELATED APPLICATION

This application is an improvement of application Ser. No. 537,552 filed Mar. 25, 1966 issued as U.S. Patent No. 3,394,815 on July 30, 1968, which patent has a common inventor with this application and has the same assignee.

SUMMARY OF THE INVENTION

Generally speaking, this invention is directed to elongated tubular filter elements of relatively small diameter for use in a filter pressure vessel in which a large number of the filter elements are desirable to afford a maximum filter area per unit of volume. The filter elements include a perforated tube or fluted core having a smooth exterior surface, and smooth open ends. This perforated tube may be formed from a plastic material with a separate and independent internal stiffening means or a perforated metal tube, a rigid extruded plastic, or a plastic coated metal, and the smooth ends may be insured by plastic collar inserts. A flexible fabric filter sleeve having its ends folded over the smooth ends or rims and tucked into the tube ends is retained therein by tubular connectors which fit into each end of the tube or collar inserts. The smooth but preferably irregular outer surface of the tube and its ends reduces wear on this sleeve as it flexes in operation, particularly during backwash of the filter assembly as well as increases the filtering area over the non-perforated parts of its tubular support. One of the tubular connectors includes the sole mounting means for the filter element comprising a radially outward peripheral flange having a deep annular groove on its axial inner face for seating over half the volume of a resilient sealing O-ring, which seals the flange around the edge of an apertured supporting plate or partition, the edge of which aperture may also be grooved to provide an additional seat for the O-ring. A fastening means in the form of a bolt may extend axially through the tube and tubular connectors for releasably holding these connectors in engagement with the ends or collar inserts during backwash and for easy replacement of the filter sleeves. The supporting connector having the flange may be provided with an internal spider for supporting one end of this bolt and permitting filtered liquid to pass from the tubular filter element, while the other end connector only has an aperture for the bolt so that when assembled the bolt closes that end of the tubular filter element.

OBJECTS AND ADVANTAGES

An object of this invention is to provide a support means for a tubular connector of a filter element with a seal seat which positively retains a sealing element therein.

Another object is to provide a tubular filter element with a permanent positive fastening means which extends substantially therethrough to hold it together during back washing, and which permits easy replacement of a tubular filter strainer sleeve.

Another object is to provide a tubular filter element which is rigid and doesn't bend during use and which has a smooth outer surface and ends so as to reduce wear and tear of the flexible filter strainer sleeve held thereon.

Still another object is to provide a separate and replaceable filter medium or sleeve which increases the filter area because it is held away from the non-perforated parts of its perforated tubular support by a smooth irregular plastic surface on that support.

BRIEF DESCRIPTION OF THE DRAWINGS

The above mentioned and other features, objects, and advantages, and a manner of attaining them are described more specifically below by reference to embodiments of the invention shown in the accompanying drawings, wherein.

DETAILED DESCRIPTION OF PREFERRED EMBODIMENTS

Figure 1:
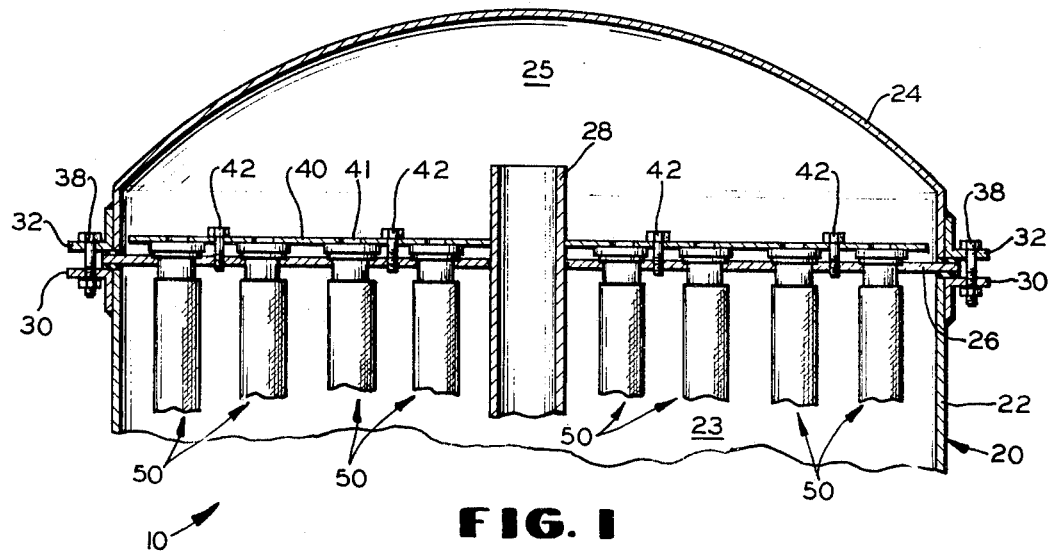
FIG. 1 is a fragmentary vertical sectional view showing the upper portion of a pressure vessel filter unit incorporating the tubular filter elements according to the invention.
Figure 2:
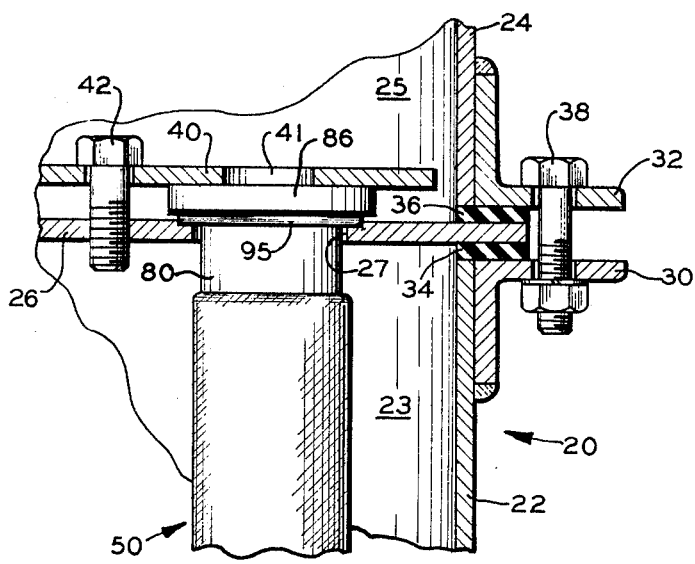
FIG. 2 is an enlarged fragmentary detail view of the right hand portion of FIG. 1 showing the support for such a tubular filter element.

As shown in FIGS. 1 and 2, a filter assembly 10 may comprise a vertical, cylindrical pressure vessel or casing 20 made of a material resistant to corrosion or other action by a liquid to be filtered, and a plurality of tubular filter elements 50 which are disposed in the interior thereof.

(I) The pressure vessel

The pressure vessel 20 is preferably constructed of two secured together sections comprising an open top, large lower section 22 and a smaller upper domed cover section 24. Separating the opposed open ends of these vessel sections is an apertured partition or filter supporting plate 26 which divides the interior of the vessel into a lower contaminated liquid inlet chamber 23 and an upper filtrate outlet chamber 25. The inlet chamber 23 has an inlet opening, not shown, preferably adjacent the bottom of the vessel 22, and the outlet chamber 25 has an outlet duct 28, shown herein passing through the inlet chamber 23 for easy removal of the domed cover section 24.

The outer peripheral margin of the plate 26 may be clamped between annular flanges 30 and 32 (see FIG. 2) which are provided on the lower and upper vessel sections 22 and 24, respectively. Gaskets 34 and 36, interposed between the flange 30 and one face of the plate 26 and the flange 32 and the other face of the plate 26, respectively, are compressed by tightening nut and bolt assemblies 38 which connect the vessel sections 22 and 24 together to provide a releasable fluid tight joint therebetween.

A removable apertured clamping plate 40, whose apertures 41 coincide with the apertures 27 in the partition plate 26, may be provided adjacent to the upper surface of the partition plate 26 and may be secured thereto by bolt means 42 for releasably holding or clamping the tubular filter elements 50 thereagainst.

(II) The filter elements

Figure 3:
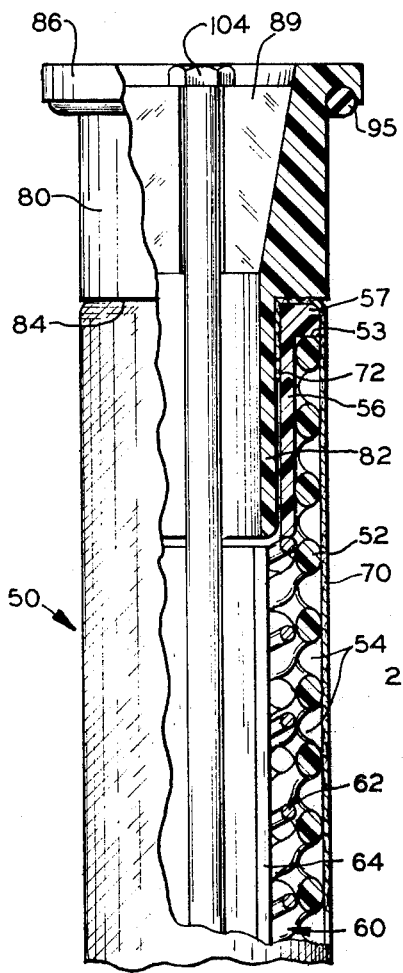
FIG. 3 is an enlarged vertical sectional view showing one form of a filter tube assembly with the parts broken away.
Figure 4:
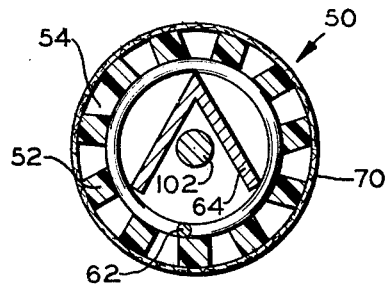
FIG. 4 is a cross-sectional view taken substantially along lines 4—4 of FIG. 3.
Figure 5:
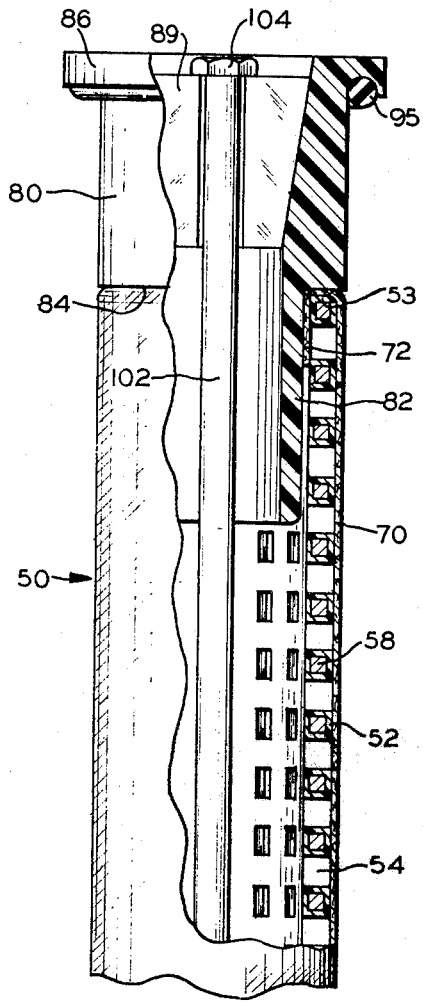
FIG. 5 is an enlarged vertical sectional view showing another form of a filter tube assembly with parts broken away.
Figure 5:
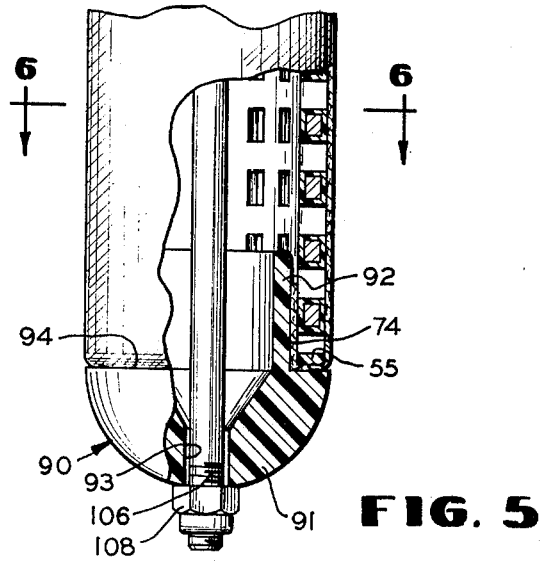
Figure 6:
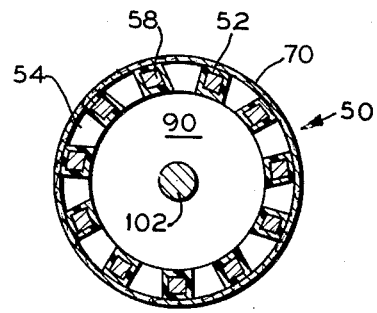
FIG. 6 is a cross-sectional view taken substantially along lines 6—6 of FIG. 5.

The tubular filter elements 50 such as shown in FIG. 3 or 5, are disposed in each of the apertures 27 of the plate 26 and depend into the lower chamber 23 of the pressure vessel 20. Such a filter element 50 may comprise an apertured cylindrical rigid tubular body or core 52 having a smooth outside surface and rounded or beaded ends 53 and 55 of an inert material, such as plastic. This tube 52 may be extruded or otherwise formed of a plastic material as shown in FIGS. 3 and 4 and is provided with rows of perforations 54 to permit the contaminated liquid being filtered to pass into the interior of the tube and thence to the upper filtrate chamber 25. Preferably this plastic tube 52 has an irregular outer surface, such as for example, shown in FIGS. 4 and 5 of Ball et al. U.S. Patent No. 3,327,864. This tube 52 may be cut to length, particularly if it is made from an extrusion, in which case a collar 56 having a flanged beaded or round rim 57 may be inserted into each end 53 and 55 of this tube. Alternately, this tube 52 may be formed of a perforated plastic having metallic core 58 as shown in FIGS. 5 and 6, or a rigid perforated metal tube may be surrounded by a fine mesh plastic sleeve. This sleeve also increases the filter area of the tube as a strainer sleeve 70 surrounding the tube will be held away from the non-perforated portion thereof.

In case that the rigid plastic tube 52 (see FIG. 3) is not stiff enough to prevent bending or collapse thereof during operation of the filter 10, its interior may be provided with a stiffener means 60. This stiffener means 60 may include a spirally coiled spring 62 in contact with the inner surface of the tube 52, and an elongated rigid member such as an angle bar 64 embraced by the spring. The spring 62 and the bar 64 extend substantially the length of the tube 52 to maintain the filter element 50 substantially straight throughout its length, with the spring additionally serving to prevent the plastic tube 52 from being crushed under pressure during filtering.

The flexible filter medium or strainer sleeve 70 surrounding the tube 52 is preferably made of a sheet of perforated or woven monofilament nylon or other similar material that is unaffected by a contaminated liquid. This filter sleeve 70 is longer than the tube 52 and has both its upper and lower ends 72 and 74 respectively, folded over the smooth rounded rims and tucked into the open ends of the tube 52.

The filter element 52 has its upper open end reinforced by an open end flanged tubular connector 80 and its lower open end closed by a tubular connector 90. This upper connector 80 has a reduced sleeve or coupling portion 82 of a diameter receivable in the end of the tube 52 or collar 56 and being a tight fit therein to frictionally retain the tucked-in end of the filter strainer sleeve 70. This reduced portion 82 also provides a shoulder 84 which extends over the smooth rim 53 of the tube 52.

Figure 8:
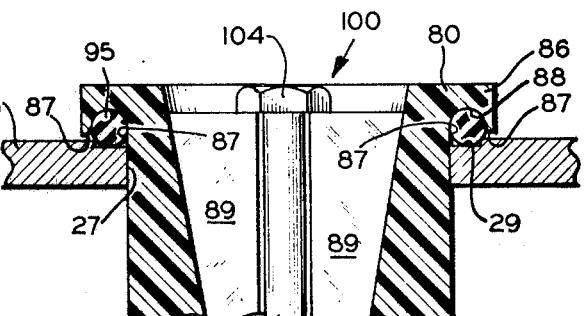
FIG. 8 is an enlarged vertical section of the top flanged tubular connector of FIG. 2 or FIG. 5 showing the O-ring sealing and supporting arrangement for the filter element.
Figure 7:
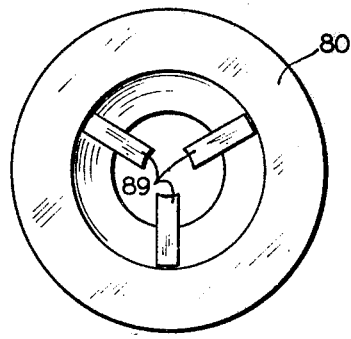
FIG. 7 is an enlarged top view of the upper tubular connector of the tubular filter element showing a spider connection for its central bolt.

This tubular connector 80 is also provided, on its upper end, with an annular, radially outward filter element supporting flange 86, see particularly FIG. 8. Beneath this flange 86 there is an O-ring gasket 95 which seals the filter element 50 against the plate 26 as previously described. The flange 86 has on its axial inner face a groove 88 in which O-ring 95 seats. This groove 88 has a cross-section radially of the flange 86 which is U-shaped with a semi-circular bottom and parallel sides 87, with the seat being deeper than half the radial circular cross-section of the annular O-ring 95 located therein. The upper face of the filter element supporting plate 26 also may be provided with a groove 29 around the periphery of the apertures 27 to further insure a fluid tight joint against displacement of the O-ring 95. To maintain the interior of this connector 86 open and yet positively secure the filter element 50 in its assembled relation, the connector 80 is provided with a spider structure having three equally spaced radially inwardly extending legs 89 (see FIG. 7), the upper faces thereof providing a seat for a bolt fastening means 100 which will be described hereinafter.

The lower tubular connector 80 has a closed semi-spherical end portion 91 and a reduced sleeve or coupling portion 92 similar to that of the reduced portion 82 of the upper connector 80, and for the same purpose. This reduced portion 92 provides a shoulder 94 which extends over the smooth rim 55 of the tube 52. The closed end 91 of this connector 90 is provided with an axial opening 93 which receives the other end of the bolt fastening means 100.

The bolt fastening means 100, which releasably but positively holds the filter element 50 in its assembled relation and prevents the lower connector 90 from being blown off during backwashing, comprises an elongated rod 102 having a head portion 104 and a threaded portion 106 engaging a self-locking nut 108. This rod 102 extends axially through the tube 52 and each of the connectors 80 and 90, with the nut 108 bearing against the closed end 91 of the tubular connector 90. The threaded lower end 106 and nut 108 seals the bottom of the filter element 50 so that no contaminated liquid can enter the interior of the filter element 50 without first passing through the strainer sleeve 70.

While there is described above the principles of this invention in connection with specific structure, it is to be clearly understood that this description is made only by way of example and not as a limitation to the scope of this invention.

We claim:
1. A tubular filter element comprising:
   (a) a perforated rigid tube open at both ends and having smooth outer and end surfaces,
   (b) a flexible filter sleeve around said tube and folded over said ends of said tube,
   (c) a tubular connector in each end of said tube for frictionally holding said folded portions of said sleeve against said tube, each tubular connector having a shoulder extending radially outwardly over said end of said tube,
   (d) bolt means extending axially through said tube and said tubular connectors for releasably holding said connectors into engagement with said ends of said tube and closing the tubular opening in one of said connectors, and
   (e) means for solely supporting said element by the other said tubular connector, said other tubular connector having a radially outwardly extending periph- eral flange providing an annular groove seat on an axial inner face of said flange which groove has a cross-section radially of said flange which is U-shaped with a semi-circular bottom and parallel sides, said seat being deeper than half the radial circular cross-section of an annular resilient O-ring to be located therein.

2. A filter element according to claim 1 wherein said tube has an outer plastic surface contacting said sleeve.

3. A filter element according to claim 1 wherein said tube is of a rigid metallic material with at least an outer plastic surface contacting said sleeve.

4. A filter element according to claim 1 wherein said tube is of a plastic material.

5. A filter according to claim 1 including a collar inserted into each open end of said tube providing a smooth beaded rim for said ends over which the ends of said sleeve fold and said connectors fitting into said collars.

6. A filter element according to claim 1 wherein said smooth outer surface of said tube is irregular.

7. A filter element according to claim 6 including a stiffener means comprising an angle bar surrounded by a helical spring within said tube to prevent axial distortion and collapse of said tube under pressure.

8. A filter comprising a vessel having an apertured partition therein, and a tubular filter element according to claim 1, and including a resilient O-ring for sealing said flange around the edge of said aperture in said partition in said vessel.

9. A filter according to claim 8 wherein the apertures of said partition have a counterbore for receiving the resilient O-ring.

References Cited

UNITED STATES PATENTS

| 3,327,864 | 6/1967 | Ball et al. | 210—457 |
| 3,394,815 | 7/1968 | Harms et al. | 210—323 |

REUBEN FRIEDMAN, Primary Examiner

F. A. SPEAR, Jr., Assistant Examiner

U.S. Cl. X.R.

210—457, 459, 497

PO-1050
(5/69)

UNITED STATES PATENT OFFICE
CERTIFICATE OF CORRECTION

Patent No. 3,503,516　　　　　　　　Dated March 31, 1970

Inventor(s)　　H. H. HARMS et al

It is certified that error appears in the above-identified patent and that said Letters Patent are hereby corrected as shown below:

Column 4, line 30, "80" should be -- 90 --

SIGNED AND
SEALED
AUG 11 1970

(SEAL)
Attest:

Edward M. Fletcher, Jr.
Attesting Officer

WILLIAM E. SCHUYLER, JR.
Commissioner of Patents